March 25, 1969 W. F. MANNING 3,434,442
OFFLOADING MOORED PRODUCTION STORAGE UNIT
Filed April 19, 1967
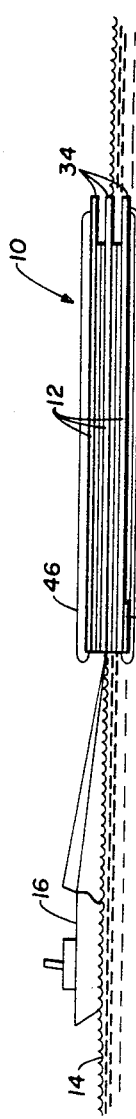
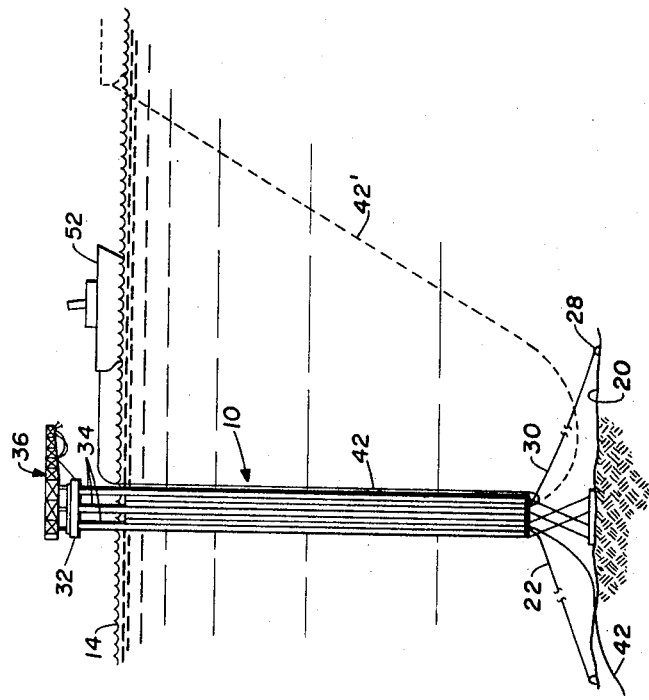
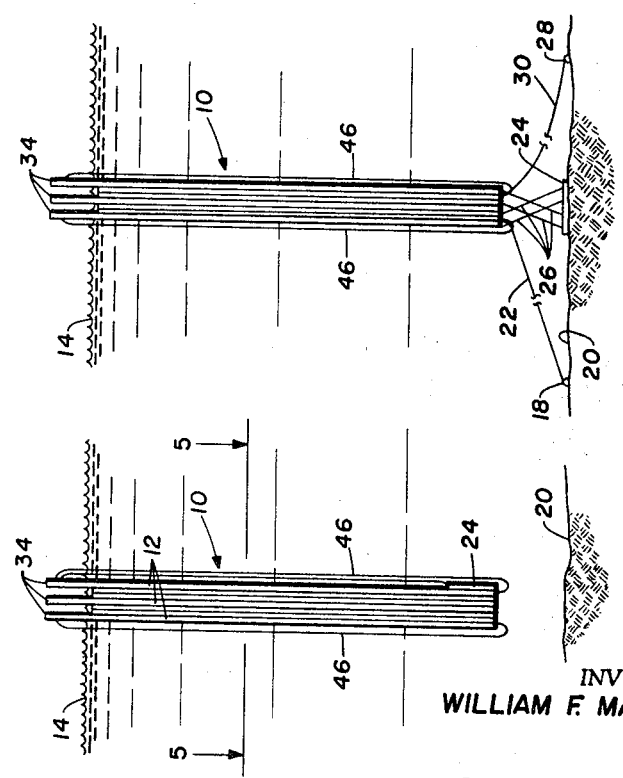
INVENTOR
WILLIAM F. MANNING
ATTORNEY

INVENTOR
WILLIAM F. MANNING

ATTORNEY

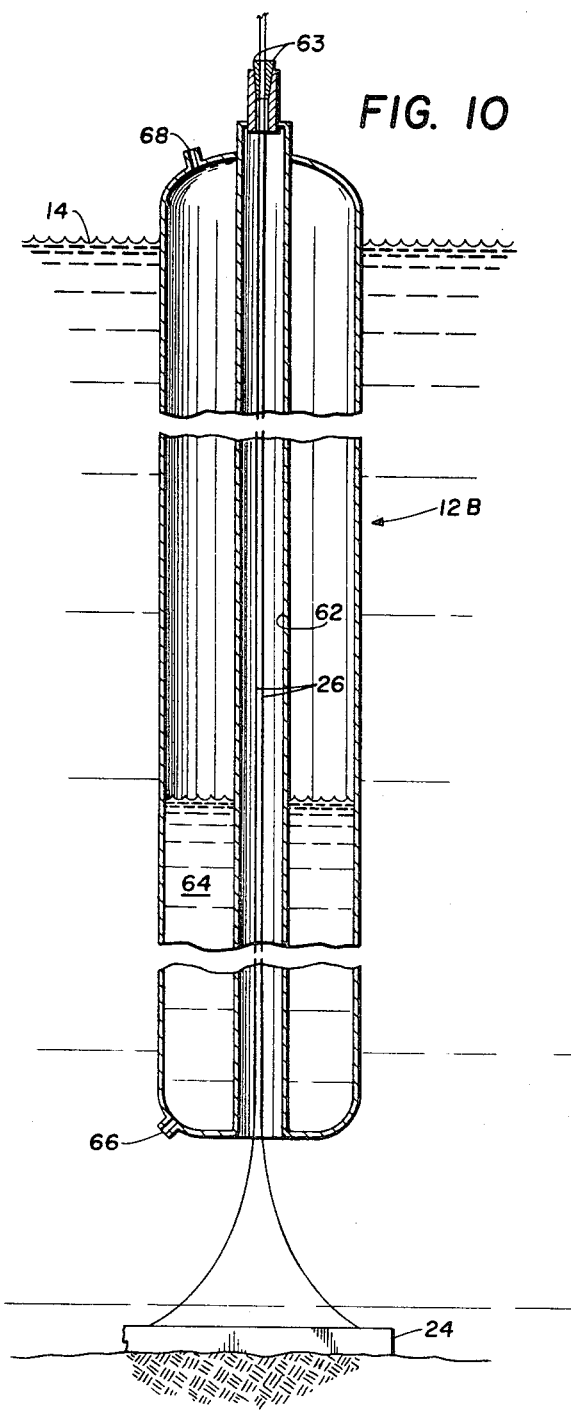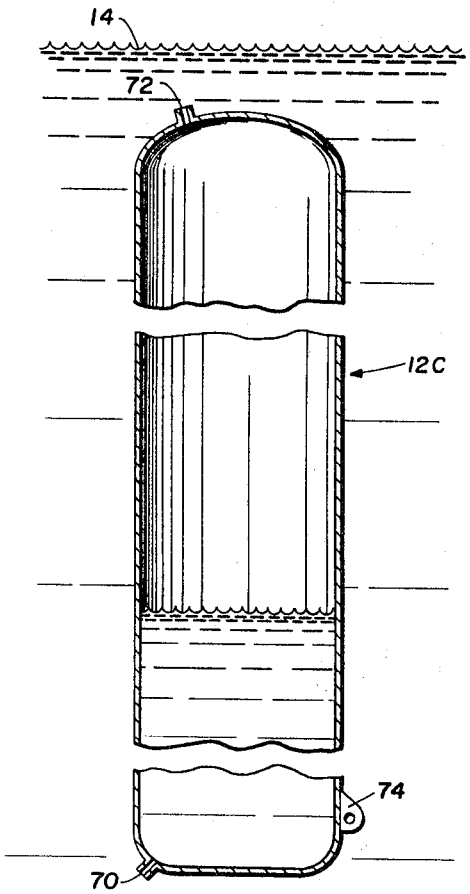

INVENTOR
WILLIAM F. MANNING

ATTORNEY

United States Patent Office 3,434,442
Patented Mar. 25, 1969

3,434,442
OFFLOADING MOORED PRODUCTION STORAGE UNIT
William F. Manning, Dallas, Tex., assignor to Mobil Oil Corporation, a corporation of New York
Continuation-in-part of application Ser. No. 451,398, Apr. 28, 1965. This application Apr. 19, 1967, Ser. No. 632,103
Int. Cl. B63b 35/44; B65d 89/10
U.S. Cl. 114—.5        7 Claims

ABSTRACT OF THE DISCLOSURE

This specification discloses apparatus for the marine storage of fluids in a floating unit and for the offloading of said fluids from the floating unit to a tanker moored thereto. The floating storage and offloading unit, designed to be moored in deep water, has a spar buoy configuration provided by a storage tank comprising a central storage space enclosed by a plurality of long tubular elements which in at least one embodiment serve as buoyancy/ballast tanks as well as open-bottomed compartments for storing anchor and flowlines. On a production deck situated on the upper end of the storage tank, above the surface of the body of water in which the storage unit is moored, is an omnidirectional loading boom with a loading hose for transferring the stored fluid from the storage tank to a tanker.

CROSS-REFERENCE TO RELATED APPLICATIONS

This application is a continuation-in-part of application Ser. No. 451,398, filed Apr. 28, 1965, now Patent No. 3,327,667, for Moored Production-Storage Tank.

BACKGROUND OF THE INVENTION

*Field of the invention*

This invention relates to the marine storage and transportation of fluid minerals, specifically crude oil and petroleum fractions, although not restricted thereto. The term "fluid" as used herein encompasses slurries and any other state of matter which can be transported through a conduit. More particularly, the invention relates to a floating unit having a spar buoy configuration to be utilized at sea for the storage or containment of fluid products, i.e., crude oils, in conjunction with the offshore production thereof, and for the offloading of the stored fluid products from a storage tank of the unit to a tanker moored thereto.

*Description of the prior art*

Present developments in the offshore oil and gas industry indicate that the drilling and production of subaqueous mineral deposits will increase significantly in the near future and will be extended to sites further from shore. The production of fluid minerals from these sites of subaqueous deposits creates, in itself, many problems, not the least of which is that of storing a produced fluid mineral until it can be transported to a processing plant on a distant shore. In the last few years, offshore operations have progressed to such far-off areas as the west coast of Africa where no refineries are close by, large storage facilities are not already present on the adjacent land, and even if they were present, no large harbors have been developed for facilitating the approach of even moderate size ocean-going tankers. The lack of nearby industrial areas to the offshore well sites, as well as the lack of harbors, has made it desirable to store the fluid minerals at sea near the production sites.

As the sites for the production of subaqueous mineral deposits move further and further from shore, the expense involved in laying product pipelines on the marine bottom, extending from the production fields to shore, and servicing the same pipelines increases. With production facilities located fifty to one hundred miles, or more, from shore, it is desirable to store the fluid products at the sites and to offload them directly onto tankers for transport directly to a refinery, even where the storage facilities could be built ashore.

Further, beyond the expense of locating storage facilities ashore and having to have long product lines extending out to the well, onshore storage facilities are actually more expensive. A partially submerged structure used to store oil at an offshore production site can be much lighter and does not require as much structural strength, since the internal pressure of the fluid against the walls of the enclosure is opposed by the water pressure on the outside of the enclosure walls. Due to the generally immiscible nature of oil and water, any space in such a storage enclosure, not filled with oil, can be filled with water to keep the differential pressure low. In fact, the minimum strength requirements of such a structure are determined more by wind and wave conditions than by the fluid load.

Another problem, becoming more prevalent, is that the deep harbors of the world, those able to accommodate the large supertankers of today, are very crowded, and therefore much time can be wasted while a tanker awaits ingress into, or egress from, a harbor. Furthermore, the number of harbors which is able to accommodate the supertankers is small and of these the majority cannot provide but a limited ingress and egress to a loaded tanker which must wait until at least partial high tide. Therefore, it would be desirable that if offshore floating storage were contemplated, this could be combined with an offloading system comprising ship mooring and fluid transportation means so that a tanker would not have to approach a congested harbor in order to receive its cargo, but could be moored to a floating unit far out at sea in an uncongested area unaffected by harbor traffic or tides.

The weakness of most offloading systems devised to date is that they utilize a floating boom, as shown in the G. A. McCammon Patents Nos. 3,093,167 and 3,245,438, issued June 11, 1963, and Apr. 12, 1966, respectively, or a flexible hose immersed in the water as shown in the Ault Patent No. 2,701,375, issued Feb. 8, 1955, and the E. Suzuki Patent No. 3,204,658, issued Sept. 7, 1965. A floating boom, from accumulations of seaweed and crustaceans, in just a short time becomes almost impossible to rotate with the available power. Present floating hoses, on the other hand, are very susceptible to deterioration in sea water, and with the size hose necessary to quickly load a tanker, it has not been feasable to remove the hose from the body of water between loading operations.

The ability of the offloading apparatus to rotate is very important. A tanker when empty must be able to head into the wind and when full must be able to head into the current. In any other attitude, the moored tanker is unstable and there is a danger of a collision between the tanker and the floating storage and offloading unit. In any but the optimum orientation, greater wave and/or wind forces are generated tending to drive the floating unit off the prescribed site.

The prior art, in the main, has separated storage and offloading apparatus, thus requiring two very expensive units where one would do the job. Where the storage capacity is of the magnitude necessary to fill a tanker, only in bottom-supported structures, such as those disclosed in the above-discussed McCammon patents, have the storage and offloading apparatus been combined. The R. B. Fuller U.S. Patent No. 3,080,583, issued Mar. 12, 1963, illustrates the type of massive structure necessary for obtaining stability at sea in a drilling operation. Although prior to being offloaded onto a tanker in some instances, no means is discussed or illustrated to permit the tanker to rotate around the structure while loading.

The Schultz U.S. Patent No. 3,076,205 discloses a storage and offloading station, without floating boom or hose, but is of the type to be utilized in sheltered water and for servicing small craft.

SUMMARY OF THE INVENTION

In accordance with this invention, a floating storage and offloading unit comprises a floating storage tank adapted to contain produced fluid minerals from the subaqueous field and an offloading means on the upper end thereof, above the surface of the body of water, for mooring a tanker to the unit while transferring the stored fluids from the storage tank to the tanker without the services of a floating boom or hose. In accordance with a specific embodiment of the invention, the floating storage tank is fabricated from a plurality of hollow sections secured together to form an internal central enclosure therewithin for holding the produced fluid minerals, i.e., oil. The hollow sections themselves are also utilized as ballasting means, for changing the orientation of the storage unit from one in which towing is relatively easy to one in which the unit can be moored at a location in a relatively stable condition.

When storing a fluid lighter than water, such as oil, the lower end of the enclosure is left open to the sea and the storage enclosure is filled by displacing the water within the enclosure with oil. Any heavy impurities or sediments brought up with the oil, of course, settles out and then drops to the marine bottom allowing the enclosure to be self-cleaning. The storage enclosure, if it does not extend to the surface of the body of water, must of course be roofed. In this instance, a minimal number of tubes would intersect the water's surface extending thereabove to form the supports for an above-surface platform and providing a substantially wave transparent structure with a spar buoy subsurface configuration. With the upper end of the stroage enclosure above the surface of the body of water, a storage roof is desirable to prevent evaporation of the lighter fractions, though not necessary.

The storage unit may be anchored in several ways. A large anchor mat, lying on the bottom, and connected to the unit by pretensioning lines, would restrain the buoyant storage tank at the same position with relation to the marine botom, regardless of the amount of oil within the enclosure, and would obviate the need for an automatic ballasting system. In many instances, however, it will be satisfactory to use a more conventional locating system consisting of anchors, flowlines, and mooring lines. In these cases, the height of the platform above the surface of the body of water will fluctuate, to some extent, with respect to the amount of fluid being stored at the time. As noted just above, this can be compensated for by an automatic ballasting system included with the sections surrounding the storage enclosure. In extremely deep water (one thousand feet or more) all mooring lines can be done away with, and the unit be dynamically positioned.

BRIEF DESCRIPTION OF THE DRAWINGS

FIGURE 1 is a side elevational view of a storage tank porion of the storage and offloading unit of the present invention illustrating the orientation of the storage tank while being towed by a tugboat to the site of a subaqueous mineral deposit.

FIGURE 2 is a side elevational view of the storage tank of FIGURE 1 showing the tank reoriented into a vertical, or fluid storage position.

FIGURE 3 is a side elevational view, similar to that of FIGURE 2, wherein a pretensioning anchor mat has been set in place on the marine bottom.

FIGURE 4 is a side elevational view of the floating storage tank of FIGURE 3 with the above-surface equipment, including an offloading boom, mounted thereon to form the complete storage and offloading unit; this figure also illustrates how flowlines may be laid across the marine bottom from the unit without a diver.

FIGURE 10 is a cross-sectional view of one of the enclosure-defining tubes of FIGURE 5 designed to function as both a ballast tank and a housing for pretensioning lines.

FIGURE 11 is a cross-sectional elevational view of one of the enclosure-defining tubes of FIGURE 6 functioning solely as a ballast tank.

DESCRIPTION OF SPECIFIC EMBODIMENTS

Figure 5:
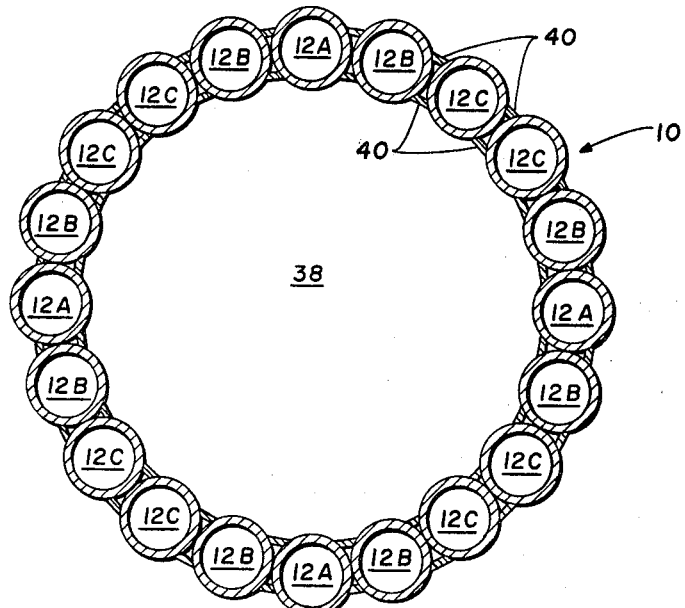
FIGURE 5 is a cross-sectional view of the storage tank of FIGURES 1–4, taken through line 5—5 of FIGURE 2, illustrating in detail the construction of the multi-tubular wall of the storage tank.

FIGURE 1 illustrates a prefabricated storage tank, generally designated 10, which consists of a plurality of hollow buoyant tubular sections 12 connected together so as to form a rigid structure having a cylindrical interior compartment designed for the stroage of oil at sea. The storage tank 10, while shown as composed of a plurality of individual tubular sections 12, could be comprised of a double hull construction, similar to that used in ships; the individual sections being formed by radial dividers separating the annulus between the hulls into separate compartments (not shown). An elongated tank 10, as is shown in the appended drawings, is particularly well adapted for use in rough deep waters where the tubular sections 12 may extend down from one hundred fifty to more than four hundred feet beneath the surface to provide stability for the floating storage and offloading unit, as well as to provide for the storage of a large volume of oil.

The storage tank 10, which is fabricated ashore, is towed, in a buoyant condition, by a tugboat 16 to a site at which it will be erected. When the tank 10, of FIGURE 1, reaches the erection site, the buoyancy/ballast tanks (to be described later) comprising a number of the tubular sections 12, at one end of the tank 10, are partially filled with water to ballast the tank 10 into a vertical position as shown in FIGURE 2. Subsequently the storage tank 10 is moored at the site. As shown in FIGURE 3, an upcurrent anchor 18 connected to the storage tank 10 by an anchor line 22 is secured in the marine bottom 20. After the upcurrent anchor 18 is set, an anchor mat 24, detachably fixed to one side of the tank 10 is unfastened therefrom and is lowered to the marine bottom 20. Grout, or some other heavy material, is directed through means (not shown) to fill the anchor mat 24. With the use of pretensioning lines 26, connected to the anchor mat 24, to hold the tank 10 at a constant distance above the marine bottom 20, some of the tubular sections 12, functioning as buoyancy tanks, are at least partially emptied of water to tension the lines 26. The storage tank 10 assumes a final position with the storage enclosure entirely below the surface 14. Several additional anchors 28 (one shown) may also be connected by untensioned anchor lines 30 to the storage tank 10 to prevent lateral shifting of the tank 10 with respect to the marine bottom 20. A production deck 32 is now installed on the storage tank 10, on upwardly extending portions 34 of some of the tubular sections 12, which extend perhaps forty to sixty feet above the surface 14 of the body of water. An offloading boom 36, mounted on the upper end of the production platform 32, will be discussed in detail in conjunction with FIGURES 12 and 13. In an embodiment in which none of the tubular sections 12 extend above the surface 14 of the body of water, a separate superstructure may be mounted on the upper end of the floating storage tank 10 to support the production deck 32 above the surface 14. When, as shown, the top of the upper end of the storage tank 10 is beneath the surface 14 of the body of water, a storage enclosure roof (not shown) is required, the lower end of the storage tank 10 remaining open to the sea provided a lighter-than-water fluid, such as oil, is being stored.

The cross section of the storage tank 10 is shown clearly in FIGURE 5 and the following table illustrates the different types of tubular sections 12 (12A, 12B, 12C) defining a storage enclosure 38 therewithin as designed for six hundred feet of water:

TABLE

| Tube designation | No. required | Low elevation [1] | High elevation [1] | Use | Structure |
|---|---|---|---|---|---|
| 12A (Figs. 5, 7 and 8) | 4 | −500 | +60 | Flowline riser housing. | Open both ends. |
| 12B (Figs. 5 and 10) | 8 | −500 | +10 | Pretensioning line and ballast. | Sealed at both ends except for line passages. |
| 12C (Figs. 5 and 11) | 8 | −500 | −50 | Ballast | Sealed at both ends. |
| 38 (Fig. 5) | 1 | −500 | −50 | Storage | Sealed at least at top. |

[1] Measured from water line.

The erected tank 10 to the lower edge of the production deck structure 32 (FIGURE 4) measures five hundred sixty feet, from a point five hundred feet below the surface 14 of the body of water to a point sixty feet above the surface 14. All of the tubes 12 are of sixty inches outside diameter and may be welded together to form a rigid frame by means of parallel pairs of plates 40, each twelve inches wide by three-fourths inch thick. The roof (not shown) extends across the storage enclosure 38 fifty feet below the surface and is sealed to all of the tubes 12, and at least twenty tubes 12, each sixty inches in diameter, would form a storage enclosure 38 on a thirty-two-foot circle. This would provide a circular storage enclosure 38 having a diameter of approximately twenty-nine feet and an area of six hundred sixty-two square fee. With the enclosure 38 being four hundred fifty feet in length, it would hold 297,800 cubic feet, approximately $50 \times 10^3$ barrels of oil.

Figure 7:
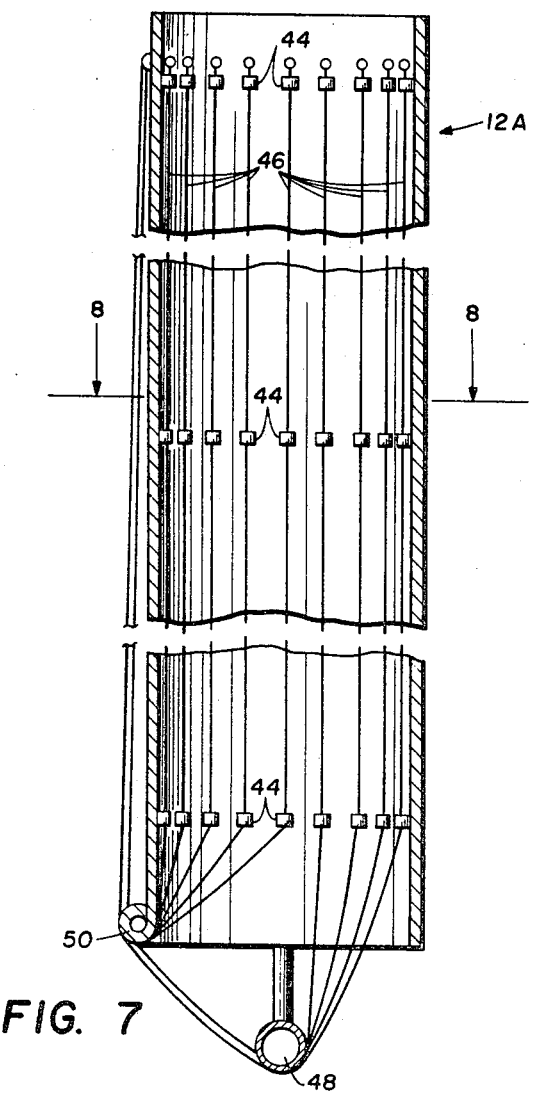
FIGURE 7 is a side elevational view, in section, of one of the enclosure-defining tubes of FIGURE 5 designed to function as a flowline housing.
Figure 8:
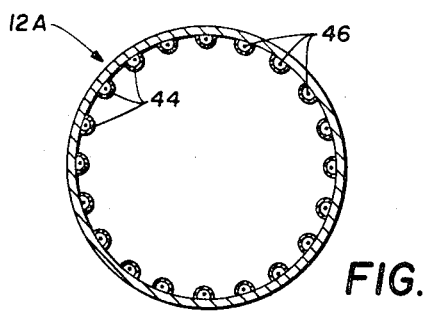
FIGURE 8 is a cross-sectional view, taken through line 8—8 of FIGURE 7, showing in detail the means for guiding and/or aligning flowlines within a tube functioning as a flowline housing.

The tubular sections 80A, one of which is shown in cross section in FIGURE 7, is an open-ended tube extending from the lower elevation of the tank storage enclosure 38 to the production deck 32 (FIGURE 4), the upper portions of the tubular sections 80A above the storage tank 10 being designated 34, as indicated with respect to FIGURES 1–4. Each tubular section 80A is adapted to hold twenty flowlines such as flowlines 42 shown in FIGURE 4, one in the process of being laid across the marine bottom 20. Since theer are four of these tubular sections 12A, which function as flowline riser housings, one storage tank 10 is capable of servicing eighty submerged wells, or groups of wells, having central gathering points (not shown). Each of the tubular flowline housings 12A has guide means for equally spacing the twenty flowlines 42 around the inner surface thereof. As shown in FIGURES 7 and 8, each of the guide means consists of a rigid loop portion 44 through which the respective entrained flowlines 42 may slide. A plurality of guide ropes 46 are each fastened at one end within the upper end of the housing 12A, at equally spaced intervals, and are threaded sequentially through the several layers of guide loops 44, the open lower ends of the respective flowline housings 12A, on lower bumpers 48 and/or 50 and up the outside of the housing 12A, in a compact group or bundle, the guide ropes 46 being fastened to the outer wall at the top of the flowline housing 12A. The bumpers 48 and 50 are provided to prevent the guide ropes 46 from rubbing along the lower metal edges of the flowline housing 12A. The bumper 48, in particular, is provided to prevent the rubbing between the guide ropes 46, farthest from the bumper 50, and the lowest level of guide loops 44 through which they must slide. If a flowline 42 is needed, the end of the appropriate guide rope 46 is unfastened from the outer wall of the housing 12A and is connected to a free end of the flexible flowline 42. The end of the guide rope 46, fastened within the upper end of the flowline housing 12A, where it can be reached from the production deck 32, is unfastened and then connected to a winch (not shown) to pull the flexible flowline 42 down the outer wall of the flowline housing 12A and up the inner wall, through the levels of guide loops 44, without the need for a diver or special equipment. The other end of the flowline 42, which has been threaded up through the guide loops 44, is coiled up on a cable-laying ship 52, and as the ship 52 moves away from the storage tank 10 the flowline is laid across the marine bottom 20 as shown at 42′ in FIGURE 4.

Figure 9:
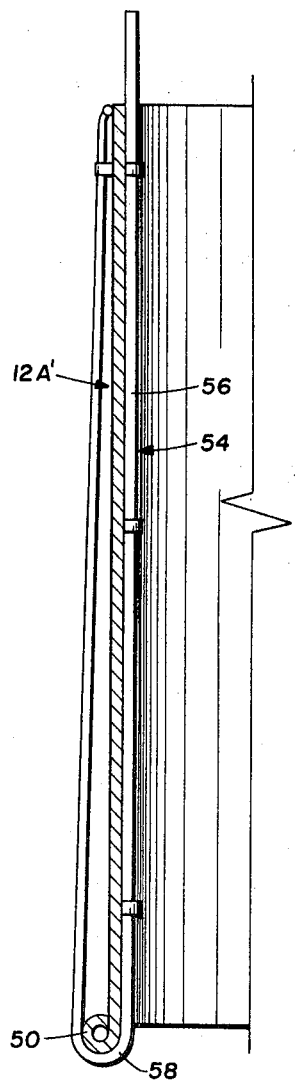
FIGURE 9 is a partial cross-sectional view of a modification of the tube designed to function as a flowline housing, shown in FIGURE 7.

FIGURE 9 illustrates a modified tubular flowline housing 12A′ wherein short composite flowlines, generally designated 54, are permanently mounted therewithin. Each flowline 54 consists of a rigid metal pipe 56 fastened permanently to the inner wall of the flowline housing 12A′ and extending out of the upper end thereof toward the production deck 32. The lower end of the rigid metal pipe 56 extends to the bottom of the flowline housing 12A′ where it is connected to one end of a flexible flowline section 58. The flowline section 58 extends up the outside of the housing 12A′ and is removably fastened to the outer wall thereof above the surface of the body of water. The upper end of each of the flexible flowline sections 58 is adapted to be connected to the free end of the flowline 42 played out from the ship 52 (FIGURE 4) after being unfastened from the outside wall of the flowline housing 12A′.

Figure 6:
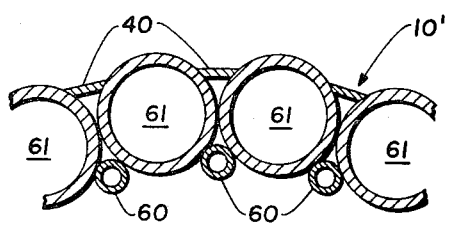
FIGURE 6 is a partial cross-sectional view of a modification of the storage tank wall construction, also taken through line 5—5 of FIGURE 2.

FIGURE 6 shows a modified storage tank 10′ of particular utility when the storage tank is needed for servicing many less wells, or central gathering points, than those contemplated to be serviced by the storage tank 10. The continuous inner wall defining the storage tank enclosure 38 is not formed, in part, by plates 40 as is the outer wall, but by sections of continuous tubing 60 welded between each adjacent pair of tubular sections 61 to form a substantially circular inner wall of the storage enclosure. The sections of continuous tubing 60 serve the double functions of (1) sealing the area between the adjacent tubular section 61, and (2) forming rigid inner flowline sections which substitute for the rigid metal pipes 56 of FIGURE 9.

FIGURE 10 illustrates one of the eight closed-end pretensioning and ballast tubular sections 12B. The closed-end tubular sections 12B each have an open central cylindrical passage 62 extending the length thereof for the pretensioning lines 26 connected to the anchor mat 24. The pretensioning lines 26 are held in the tensioned condition, after the anchor mat 24 has been set, by a pair of slip jacks 63 mounted in the upper end of the central passage 62 above the surface of the body of water. The annulus between the outer tube 12B and the walls defining the inner passage 62 form a buoyancy/ballast chamber 64. The chamber 64 may be subdivided in the vertical direction so that different portions can be flooded for changing the orientation of the storage tank 10 in stages from the horizontal towing position (FIGURE 1) to the vertical storage position (FIGURES 2–4). A port 66, for pumping in or expelling water, is shown located in the bottom of the buoyancy/ballast chamber 64 while an upper port 68 is located above the water line for pumping in or venting air.

FIGURE 11 illustrates one of the shorter closed-end tubular buoyancy/ballast sections 12C. This tubular section also has a lower water port 70 and an upper air port 72. As in the pretensioning and buoyancy/ballast tubes 12B, the tubular sections 12C may be vertically partitioned for selective ballasting. The storage tank 10, if floating free in the body of water rather than being in a pretensioning condition, can be moored to lines fastened to the structure by means of pad eyes 74.

The arrangement of mooring lines shown in FIGURES 5 and 6 of the applicant's copending application can be utilized. If no anchor mat were used and the storage tank were free floating, all of the buoyancy/ballast sections (12B and 12C) would be of the type (though not necessarily the length) indicated as 12C. The tank 10 would then be held at a constant height above the water line by an automatic ballasting system which would pump water into, and/or air out of, the tubular sections 12C as oil is pumped into the storage enclosure 38.

Figure 12:
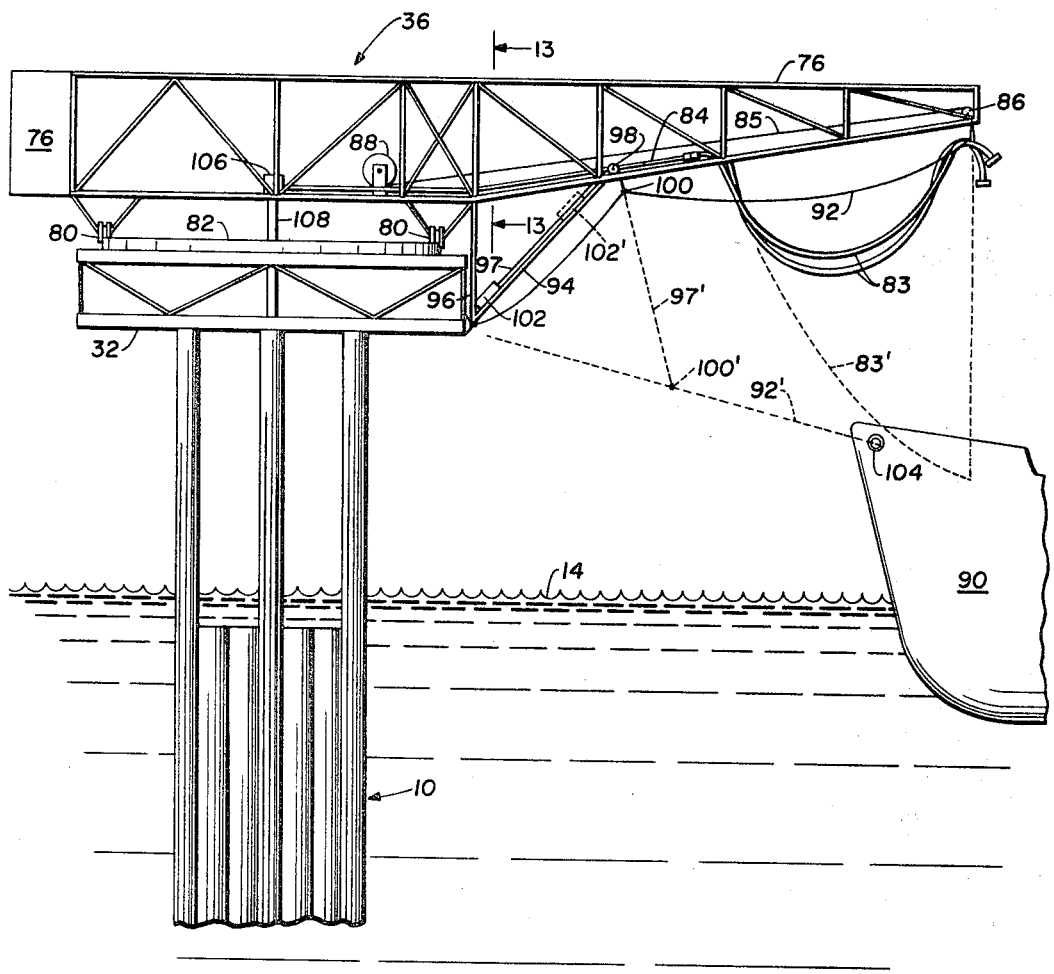
FIGURE 12 is a side elevational partial view of the storage and offloading unit of FIGURE 4 showing the details of the offloading boom.
Figure 13:
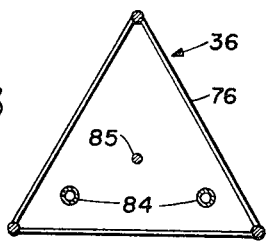
FIGURE 13 is a sectional view of the loading boom structure taken through line 13—13 of FIGURE 12.

The offloading boom 36 is shown in detail in FIGURE 12. The boom 36 comprises a skeletal framework having an extension 76 cantilevered out over the surface 14 of the body of water and a counterweight 78 affixed to the boom 36 at the opposite end thereof. The boom 36 is mounted on the production deck 32 by any means which will provide substantially free rotation of the boom on the deck. For purposes of this description, it is assumed that electric wheels 80 are mounted beneath the boom 36 and are designed to run on a circular track 82 on the upper face of the production deck 32. The electric wheels 80 may be driven from a coaxial third rail (not shown) also affixed to the production deck 32, or any other convenient means. An electric wheel is essentially a self-contained prime mover, a D.C. electric motor and gear box mounted in its rim. All of the electric wheel motors of the boom 36 are driven simultaneously, powered by a diesel electric generating system. Such units are manufactured by R. G. LeTourneau Incorporated and are described in the LeTourneau Electric Wheel brochure, page 741.1.

A pair of loading hoses 83, shown in FIGURE 12, are affixed at their inner ends to rigid hose sections 84 (as shown in FIGURE 12, and in the cross-sectional view, FIGURE 13) at a point along the length of the boom extension 76. The outer free ends of the hoses 83 are connected to a winch line 85, also shown in FIGURES 12 and 13. The winch line 85, entrained over a pulley 86 rotatably mounted at the outer end of the boom extension 76, extends back through the boom 36 to a winch 88. By the operation of the winch 88, the free ends of the hoses 83 may be lowered to a tanker 90 floating in the body of water just below. A mooring line 92 is connected at its inner end at the apex of a depending triangular section made up of struts 94 and 96. When the loading hoses 83 are in the solid line position shown in solid lines in FIGURE 12, the intermediate portion of the mooring line 92 is held up out of the water by a keeper line 97 entrained over a pulley 98 and connected to an intermediate point 100 of the mooring line while the outer end of the mooring line 92 is releasably fastened to the outer ends of the loading hoses 83. The keeper line 97 is kept taut by a counterweight 102 secured to the free inner end thereof and riding in a track (not shown) on the diagonal strut 94. When the hoses 83 are in the phantom line position 83', that is, when the winch 88 has been let out, the lower outer ends of the hoses 83 reach to the waiting tanker 90. The outer end of the mooring line 92, secured to the outer ends of the hoses 83', is released from the hoses 83' and is secured to the mooring cleat 104 of the tanker 90. As the tanker 90 tends to pull away from the floating unit, the mooring line 92 is drawn taut into the position shown in phantom at 92' with the counterweight 102 as shown at 102' up at the upper end of the diagonal strut 94 and the keeper line indicated at 97' extending tautly down from the pulley 98 to the point 100' where it is secured to the mooring line 92'. Since both the mooring line 92 and the hoses 83 are secured to the rotatable boom 36, the tanker 90 can be repositioned into the wind or waves, as the case may be, and the position may be changed while loading is in process without disconnecting the hoses 83 or the mooring line 92. The rigid hose sections 84 extend into a swivel joint 106 journaled at the top of a vertical stanchion 108 extending upwardly from the center of the storage tank 10 and into the boom structure.

The inner end of the mooring line 92, rather than being connected to a depending section of the boom 36, may be attached to a trolley (not shown) constrained on a circular track extending around the periphery of the production deck 32. The trolley could be freely rotatable on its track, or it could be driven by electric wheels as described with respect to the boom 36.

Although the present invention has been described in connection with details of specific embodiments thereof, it is to be understood that such details are not intended to limit the scope of the invention.

What is claimed is:

1. An offshore floating storage and offloading unit comprising: a spar buoy, said spar buoy being provided with a vertically elongated buoyant tubular hull defining a central, vertically elongated, enclosed area for the storage of fluid minerals therewithin, said tubular hull having buoyancy compartments providing buoyancy for said spar buoy; a loading boom, means for rotatably mounting and supporting said loading boom on the upper end of said tubular hull, means for the transportation of fluid minerals stored in said enclosed area to a fixed point on said boom intermediate the ends thereof, a loading hose having the inner end thereof fixed with respect to said loading boom intermediate the ends thereof and in fluid connection with said means for the transportation of fluid minerals from said enclosed area, the outer end of said loading hose being adjustably supported from the outer end of said boom, means for transferring fluid minerals stored within said enclosed area to an adjacent vessel through the outer end of said hose without any portion of said hose coming into contact with the body of water in which said storage and offloading unit is to be floating, a means for mooring said adjacent vessel including a mooring line and a means for securing the inner end of said mooring line with respect to said tubular hull of said floating storage and offloading unit so as to allow a vessel to circle said floating storage and offloading unit while remaining at a constant distance therefrom, and means for positioning said floating storage and offloading unit at a prescribed offshore site.

2. The offshore floating storage and offloading unit of claim 1 wherein said buoyancy compartments are located along at least a portion of the length of said elongated buoyant tubular hull between inner and outer walls thereof, said enclosed area extending within said buoyancy compartments.

3. The floating offshore storage and offloading unit of claim 1 wherein said means for securing said inner end of said mooring line is rigidly fixed to said rotatable loading boom and wherein counterweight means are provided for yieldingly supporting the intermediate portion of said mooring line.

4. An offshore floating storage and offloading unit comprising: a spar buoy, said spar buoy being provided with a vertically elongated buoyant tubular hull defining a central, vertically elongated, enclosed area for the storage of fluid minerals therewithin, said tubular hull having buoyancy compartments providing buoyancy for said spar buoy, said buoyancy compartments of said tubular hull being provided with a plurality of individual hollow sections, said hollow sections forming at least first, second, and third groups of cylindrical tubes; each tube of said first group of cylindrical tubes being open at both ends and serving to house flowlines; each tube of said second group of cylindrical tubes being closed at both ends and having an open passage extending longitudinally therethrough, an enclosed annulus formed between each tube of said second group of cylindrical tubes and the respective longitudinal passage extending therethrough, said annulus serving as a ballasting chamber, and said passage therethrough serving as a housing for pretensioning lines to be connected to an anchor mat to be set on the bottom of said body of water to position said offshore floating storage and offloading unit at on offshore site; each tube of said third group of cylindrical tubes being completely closed at both ends and serving as a ballasting chamber; and means connecting said sections together to form a continuous, substantailly fluidtight wall; a loading boom, means for rotatably mounting and supporting said loading boom on the upper end of said tubular hull, means for the transportation of fluid minerals stored in said enclosed area to a fixed point with respect to said boom, a loading hose having the inner end thereof fixed with respect to said loading boom and in fluid connection with said means for the transportation of fluid minerals from said enclosed area, means for transferring fluid minerals stored within said enclosed area to an adjacent vessel through the outer end of said hose, a means for mooring said adjacent vessel including a mooring line and a means for securing the inner end of said mooring line with respect to said tubular hull of said floating storage and offloading unit so as to allow a vessel to circle said floating storage and offloading unit while remaining at a constant distance therefrom, and means for positioning said floating storage and offloading unit at a prescribed offshore site.

5. The floating offshore storage and offloading unit of claim 4 wherein each tube of said first, second, and third groups of cylindrical tubes, comprising said hollow sections, are denoted as "A," "B," and "C," respectively, said tubes being connected to form said enclosure in a repetitive pattern in series of "A, B, C, C, B."

6. The floating offshore storage and offloading unit of claim 4 wherein means are fixed within at least one of said tubes of said first group of cylindrical tubes to guide at least a pair of parallel ropes down the inner wall, across the bottom edge, and up the outer wall, of said one of said tubes of said first group of cylindrical tubes; means adjacent the upper end of said one of said tubes of said first group of cylindrical tubes for holding the ends of said rope near the top of the one of said tubes of said first group of cylindrical tubes whereby the end of one of said ropes outside said one of said tubes of said first group of cylindrical tubes can be released from the holding means and can be instead attached to a flowline to draw said flowline down the outside of said one of said tubes of said first group of cylindrical tubes and up therethrough within said guide means without a diver when said storage device is floating in said body of water with the lower end of said one of said tubes of said first group of cylindrical tubes being considerably below the surface of said body of water.

7. A method for transporting an offshore floating storage and offloading unit to a fluid mineral production site in a body of water and for erecting and assembling said unit at said site, wherein said offshore floating storage and offloading unit comprises; a spar buoy, said spar buoy being provided with a vertically elongated buoyant tubular hull defining a central, vertically elongated, enclosed area for the storage of fluid minerals therewithin, said tubular hull having buoyancy compartments providing buoyancy for said spar buoy, said buoyancy compartments being a plurality of long hollow airtight sections, means for selectively filling with water, or emptying of water, each of said sections, the horizontal distance across said tubular hull being small with respect to the longitudinal dimension of each of said sections; a loading boom, means for rotatably mounting and supporting said loading boom on the upper end of said tubular hull, means for the transportation of fluid minerals stored in said enclosed area to a fixed point with respect to said boom, a loading hose having the inner end thereof fixed with respect to said loading boom and in fluid connection with said means for the transportation of fluid minerals from said enclosed area, means for transferring fluid minerals stored within said enclosed area to an adjacent vessel through the outer end of said hose, a means for mooring said adjacent vessel including a mooring line and a means for securing the inner end of said mooring line with respect to said tubular hull of said floating storage and offloading unit so as to allow a vessel to circle said floating storage and offloading unit while remaining at a constant distance therefrom, and means for positioning said floating storage and offloading unit at a prescribed offshore site, comprising the following steps:

(a) filling at least some of said hollow sections with air so that said tubular hull will float on its side in a body of water with the longitudinal dimension of each of said sections being parallel to the surface of said body of water;

(b) towing said buoyant tubular hull to said site while said tubular hull is floating in said body of water;

(c) ballasting at least some of said sections, upon reaching said site, so as to reorient said buoyant tubular hull into an upright position in which said longitudinal dimension of each of said sections is perpendicular to said surface of said body of water;

(d) mooring said buoyant tubular hull at said site;

(e) controlling the ballast in said hollow sections to adjust the height of said buoyant tubular hull in said body of water;

(f) mounting a production deck on the upper end of said buoyant tubular hull, said production deck being above the surface of said body of water;

(g) rotatably mounting a loading boom, having a loading hose connected thereto, on the upper end of said production deck above the surface of said body of water; and (h) operatively connecting the enclosed area within said buoyant tubular hull with a loading hose of said loading boom for transporting fluid minerals stored in said buoyant tubular hull to a vessel moored to said offshore floating storage and offloading unit and rotatable thereabout.

References Cited

UNITED STATES PATENTS

| | | |
|---|---|---|
| 3,360,810 | 1/1968 | Busking. |
| 2,641,785 | 6/1953 | Pitts et al. |
| 2,861,532 | 11/1958 | Ault. |
| 3,120,106 | 2/1964 | Fostee. |

TRYGVE M. BLIX, *Primary Examiner.*

U.S. Cl. X.R.

9—8; 114—230